(12) United States Patent  
Nakaya

(10) Patent No.: US 6,258,594 B1  
(45) Date of Patent: Jul. 10, 2001

(54) HUMAN WASTE TREATMENT SYSTEM

(75) Inventor: Jun Nakaya, Osaka (JP)

(73) Assignee: Suiko Kinzoku Kabushiki Kaisha, Osaka (JP)

( * ) Notice: Subject to any disclaimer, the term of this patent is extended or adjusted under 35 U.S.C. 154(b) by 0 days.

(21) Appl. No.: 09/641,956

(22) Filed: Aug. 21, 2000

(30) Foreign Application Priority Data

Aug. 23, 1999 (JP) .................................................. 11-235453

(51) Int. Cl.[7] .................................................... C12M 1/00
(52) U.S. Cl. .................................... 435/290.1; 435/290.4; 210/413; 210/414; 210/415; 4/319; 4/320; 4/DIG. 4; 4/DIG. 12
(58) Field of Search ............................... 4/318, 319, 320, 4/DIG. 4, 9, 12; 435/290.1, 290.2, 290.4; 210/413–415

(56) References Cited

U.S. PATENT DOCUMENTS 5,296,136 * 3/1994 Able ..................................... 210/158
5,773,281 * 6/1998 Ichikawa et al. .................. 435/290.2
5,945,332 * 8/1999 Fors ...................................... 435/262

FOREIGN PATENT DOCUMENTS 10-286566  10/1998  (JP) .

\* cited by examiner

*Primary Examiner*—David A. Redding
(74) *Attorney, Agent, or Firm*—Wenderoth, Lind & Ponack, L.L.P.

(57) ABSTRACT

A waste disposal system separates human wastes into solid and liquid parts for subsequent treatment such as microbial decomposition treatment and/or activated sludge treatment. The system includes an outer box. A cylindrical member made of a water-permeable material is received in the outer box. A top plate closes the top openings of the outer box and the cylindrical member. The latter has an open bottom. A helical rotary brush is mounted on a vertical rotary shaft extending through the top plate into the cylindrical member so as to be coaxially received in the cylindrical member. The top plate is formed with a port through which waste is adapted to be introduced into the cylindrical member. A closure member closes the bottom opening of the space defined between the outer box and the cylindrical member and is formed with a discharge port.

7 Claims, 8 Drawing Sheets

HUMAN WASTE TREATMENT SYSTEM

BACKGROUND OF THE INVENTION

This invention relates to a human waste treatment system for separating human waste into solid and liquid parts for subsequent treatment such as microbial decomposition treatment and/or activated sludge treatment.

Microbial decomposition and activated sludge treatments are two major known ways to treat human waste. The former method is now especially popular because with this method, decomposed solid parts of the waste can be used as organic fertilizers.

In the microbial decomposition treatment, if the liquid content of the waste is too high, the decomposition capability drops extremely. Conversely, too low a water content will result in reduced activity of microbes. It is therefore important to accurately control the treating temperature and humidity to maintain high microbe activity.

In the activated sludge treatment, if waste is introduced into a decomposition tank in an amount exceeding its treating capacity, growth of bacteria in the tank will slow down, thus resulting in a sharp drop in the decomposition capability. Part of the waste may thus be discharged untreated. Japanese patent publication 10-286566 discloses an activated sludge treatment system, which will be described in the description of the second embodiment of the present invention. Since waste is directly introduced into this system, large amounts of scam, flock and sludge are produced. Thus, this system needs many tanks and thus is costly.

An object of the present invention is to provide a waste treatment system for separating human waste into solid and liquid parts for subsequent treatment such as microbial decomposition treatment and/or activated sludge treatment.

SUMMARY OF THE INVENTION

According to this invention, there is provided a waste treatment system comprising a waste separator comprising an outer box, a cylindrical member made of a water-permeable material and coaxially received in the outer box, a top plate closing the top openings of the outer box and the cylindrical member, the cylindrical member having an open bottom, a vertical rotary shaft coaxially extending through the top plate into the cylindrical member, a helical rotary brush mounted on the vertical rotary shaft, the top plate being formed with a port through which waste is introduced into the cylindrical member, a closure member for closing the bottom opening of the space defined between the outer box and the cylindrical member and formed with a discharge port, and a drive unit for rotating the rotary shaft and the brush, whereby waste supplied into the cylindrical member is separated into a liquid part, which passes through the cylindrical member into the space and is discharged through the discharge port, and a solid part, which is moved down in the cylindrical member by the brush and drops through the open bottom.

The waste disposal system may further comprise a microbial decomposition tank provided under the waste separator so as to communicate with the interior of the cylindrical member through its open bottom; an activated sludge treatment device comprising a plurality of tanks and connected to the discharge port of the separator; or a discharge pipe connected to the discharge port and formed with numerous holes, and an evaporation mat in which at least the portion of the discharge pipe formed with the numerous holes is buried.

Waste introduced into the sleeve is pulverized into small pieces by the helical brush with the water content of the waste removed. The remaining solid content is discharged through the bottom opening of the sleeve. The solid content discharged is decomposed in the decomposition tank and used as organic fertilizers.

The separated liquid content of the waste scarcely contains scum, flock and sludge, so that it can be extremely efficiently decomposed in the activated sludge decomposition device.

When the separated liquid content is introduced into the evaporation mat, it is decomposed by microbes in the soil layer and enriches the soil.

If the system is used for a temporary toilet, which is used mainly in the daytime and seldom used in the nighttime, a storage tank for storing the separated liquid content is provided and the decomposition tank is preferably operated while supplying separated water into the decomposition tank from the storage tank to keep the water content of the decomposition tank to a suitable level for decomposition.

Other features and objects of the present invention will become apparent from the following description made with reference to the accompanying drawings, in which:

DETAILED DESCRIPTION OF THE PREFERRED EMBODIMENTS

[First Embodiment]

Figure 1:
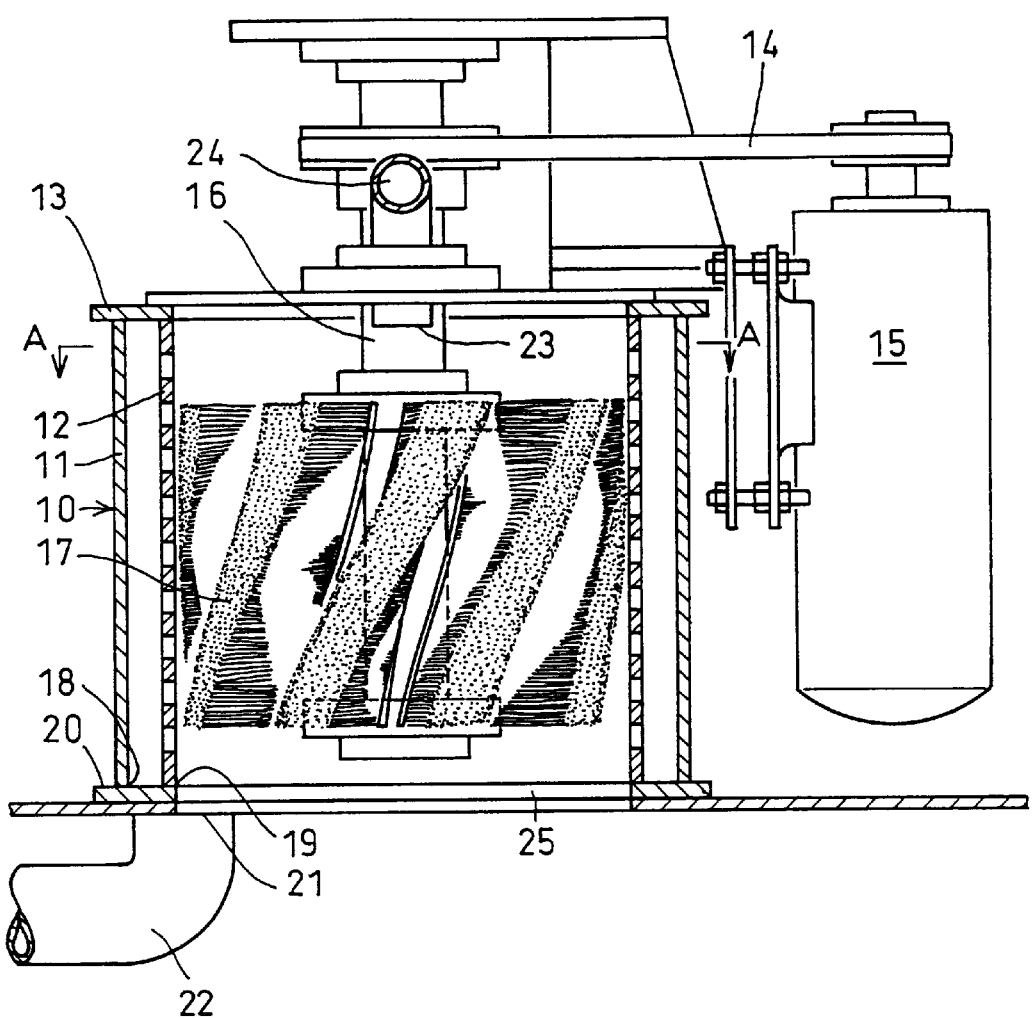
FIG. 1 is a vertical sectional view of a first embodiment.
Figure 2:
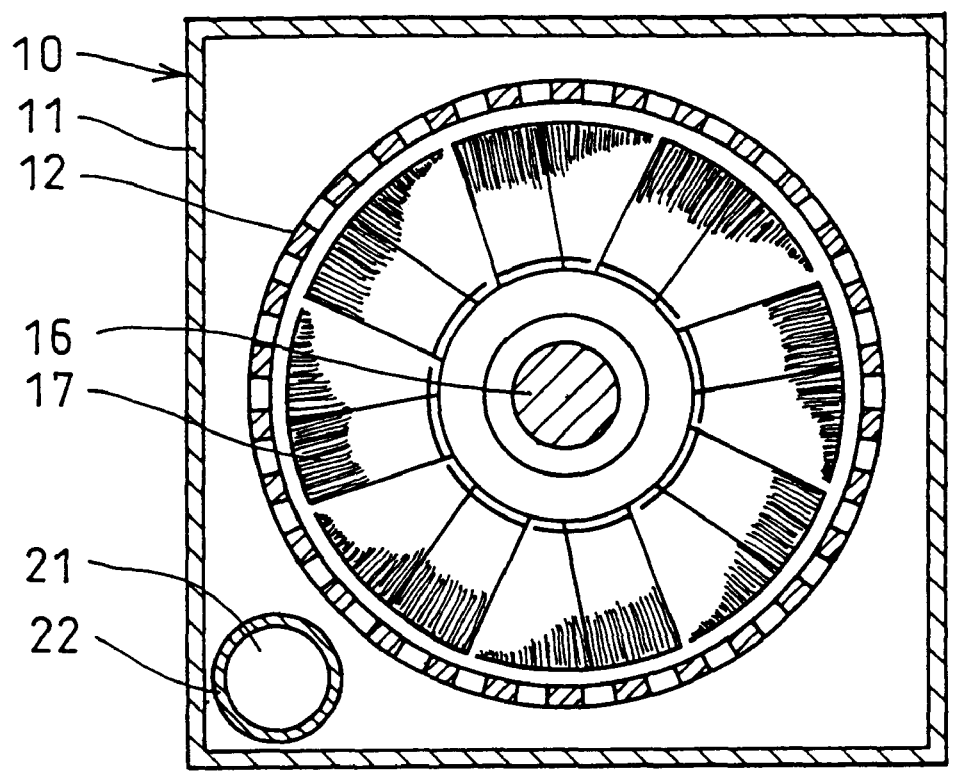
FIG. 2 is a sectional view along line A—A of FIG. 1.
Figure 3:
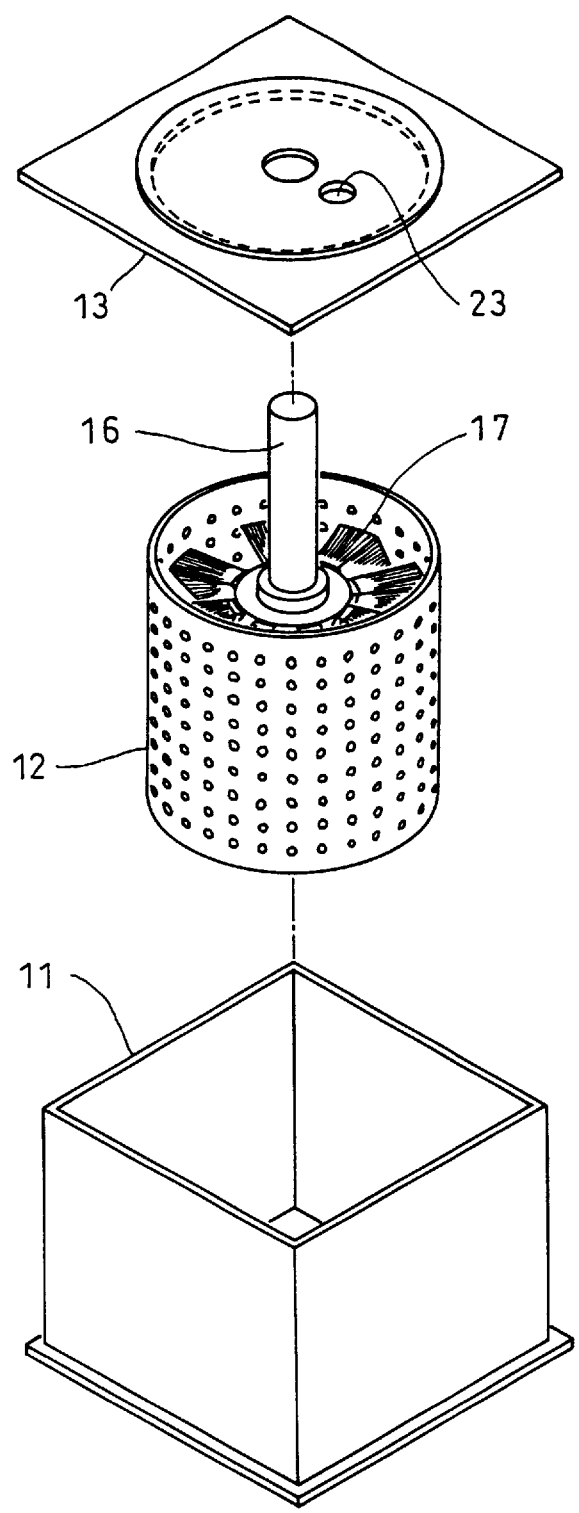
FIG. 3 is an exploded perspective view of the first embodiment of FIG. 1.

FIGS. 1–3 show the first embodiment, which is a human waste separator 10 for separating human waste into solid parts and liquid parts.

It includes an outer box 11 and a water-permeable cylindrical sleeve 12 formed from a punched net coaxially received in the box 11 and having many holes. The top openings of the box 11 and the sleeve 12 are closed by a top plate 13. A vertical rotary shaft 16 having its top supported by a stationary member extends through the center of the top plate 13 into the sleeve 12 and carries a helical brush 17 at its portion inside the sleeve. The rotary shaft 16 is rotated by a motor 15 through a belt 14.

A space defined between the outer box 11 and the sleeve 12 has its bottom opening 18 closed by a closure member 20 which is formed at one corner thereof with a discharge port 21 (FIG. 2) to which is connected a discharge pipe 22. The top plate 13 is formed with a waste introducing port 23 (FIG. 3) which is connected to a waste pipe 24. Through the pipe 24 and the port 23, waste is introduced into the sleeve 12. The bottom of the sleeve 12 is open.

When waste is introduced into the sleeve 12 through the pipe 24 and the port 23 with the brush 17 rotating, the waste is pulverized into small pieces by the brush 17 while being scattered radially outwardly by centrifugal force. The water content contained in the waste thus radially passes through the holes in the wall of the sleeve 12 into the space between the sleeve and the outer box 11 and is discharged through the discharge port 21. On the other hand, the solid content is gradually moved down the sleeve 12 by the action of the helical brush 17 and is discharged through the bottom opening of the sleeve 12.

[Second Embodiment]

Figure 4:
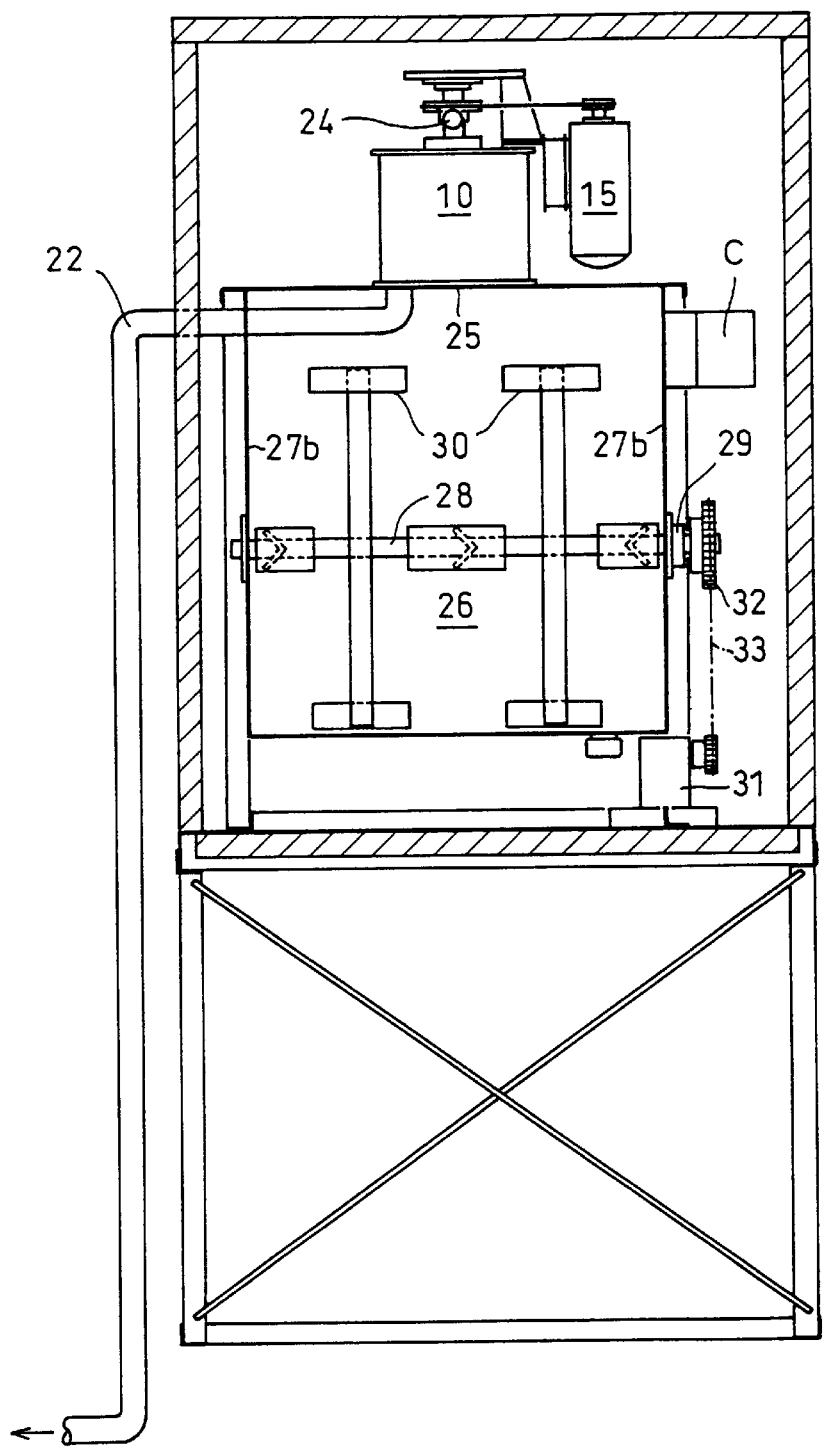
FIGS. 4 and 5 are front and side sections of a second embodiment.
Figure 5:
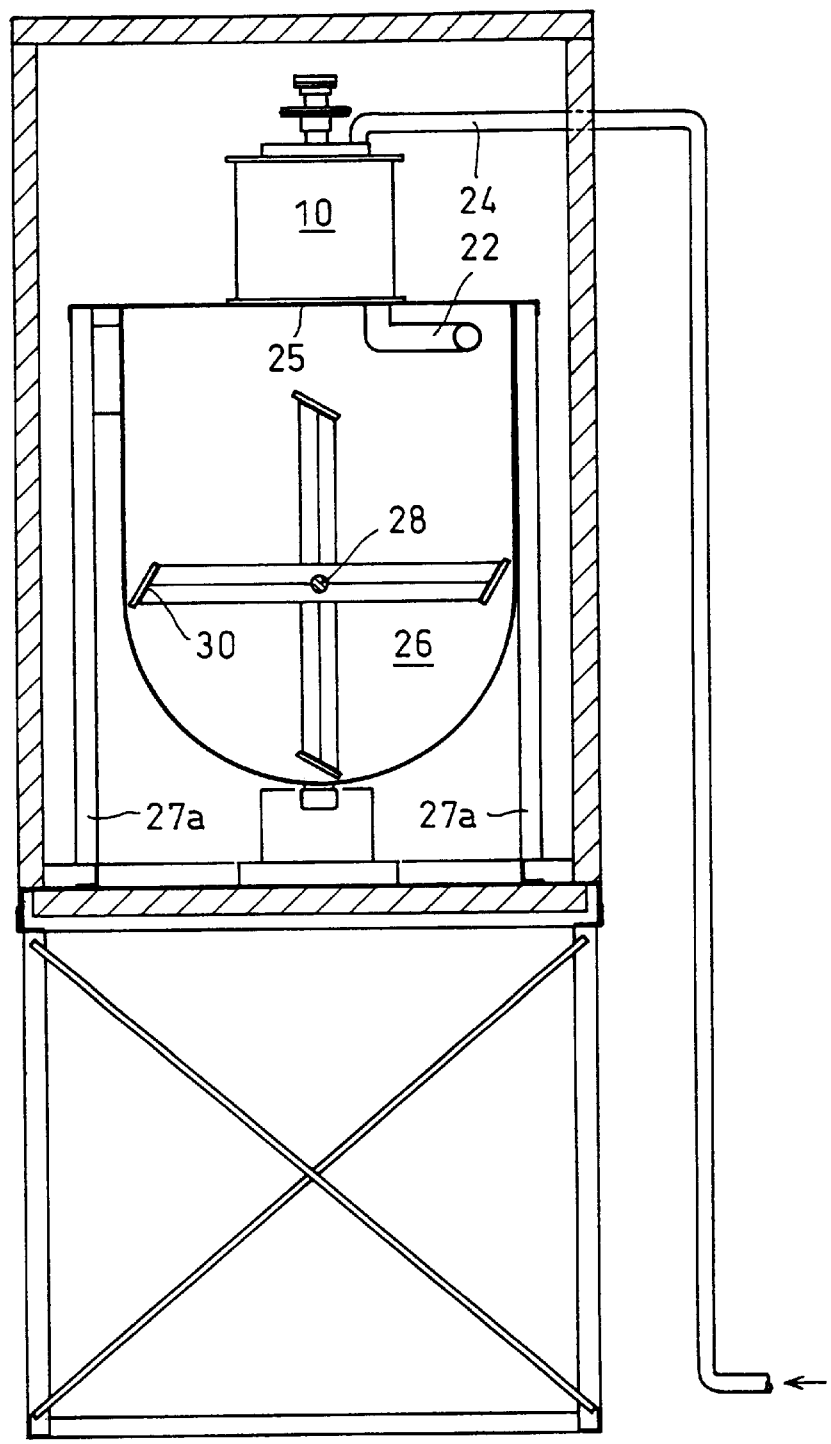

FIGS. 4 and 5 show the second embodiment, which is a waste disposal system comprising the waste separator 10 of the first embodiment, and a microbial decomposition tank 26 provided under the separator 10 for continuously treating the solid content of waste dropped from the separator 10 by the action of microbes. For this purpose, the bottom opening 25 of the sleeve 12 directly communicates with the decomposition tank 26 and its edge is sealed by the top wall of the tank 26.

The tank 26 has a semicylindrical lower portion and a box-shaped upper portion, and is supported by side walls 27a (FIG. 5) and end walls 27b (FIG. 4). A rotary shaft 28 extends horizontally between the centers of the end walls 27b and is supported by the walls 27b through bearings 29. Two agitators 30 are mounted on the shaft 28 spaced horizontally from each other. Each agitator 30 comprises a shank formed of an angle steel bar, and vanes secured to both ends of the shank. The rotary shaft 28 is rotated by a motor 31 through a sprocket 32 and a roller chain 33.

As shown in FIG. 5, the agitators 30 have such a length that the vanes barely touch the semicylindrical bottom surface of the tank 26. Thus, as the agitators 30 are rotated, waste stuck on the bottom surface of the tank can be scraped off and agitated by the vanes with no dead angle.

Known microbe chips such as ones planted with microbes that can decompose carbohydrate fibers in the solid waste and microbes that can decompose protein contents in the waste are dumped in the tank 26.

A control unit C is provided to control the atmosphere in the tank 26 to maintain maximum activity of microbes by e.g. adjusting the temperature in the tank at 40–60° C. and the relative humidity at 40–100%. Because the humidity in the tank tends to evaporate by the heat of a heater and temperature rise with activity of microbes, the liquid part of the waste discharged from the separator 10 is partially introduced into the tank 26 to supplement the humidity in the tank.

The purpose of the agitators 30 is to mix waste newly introduced into the tank 26 from the separator 10 with waste that has already been decomposed. The agitators 30 should not be rotated at a speed far exceeding the speed necessary to achieve this purpose because too high a rotational speed of the agitators would only impair decomposition. The speed should be controlled in view of the size of tank and the amount of waste.

[Third Embodiment]

Figure 6:
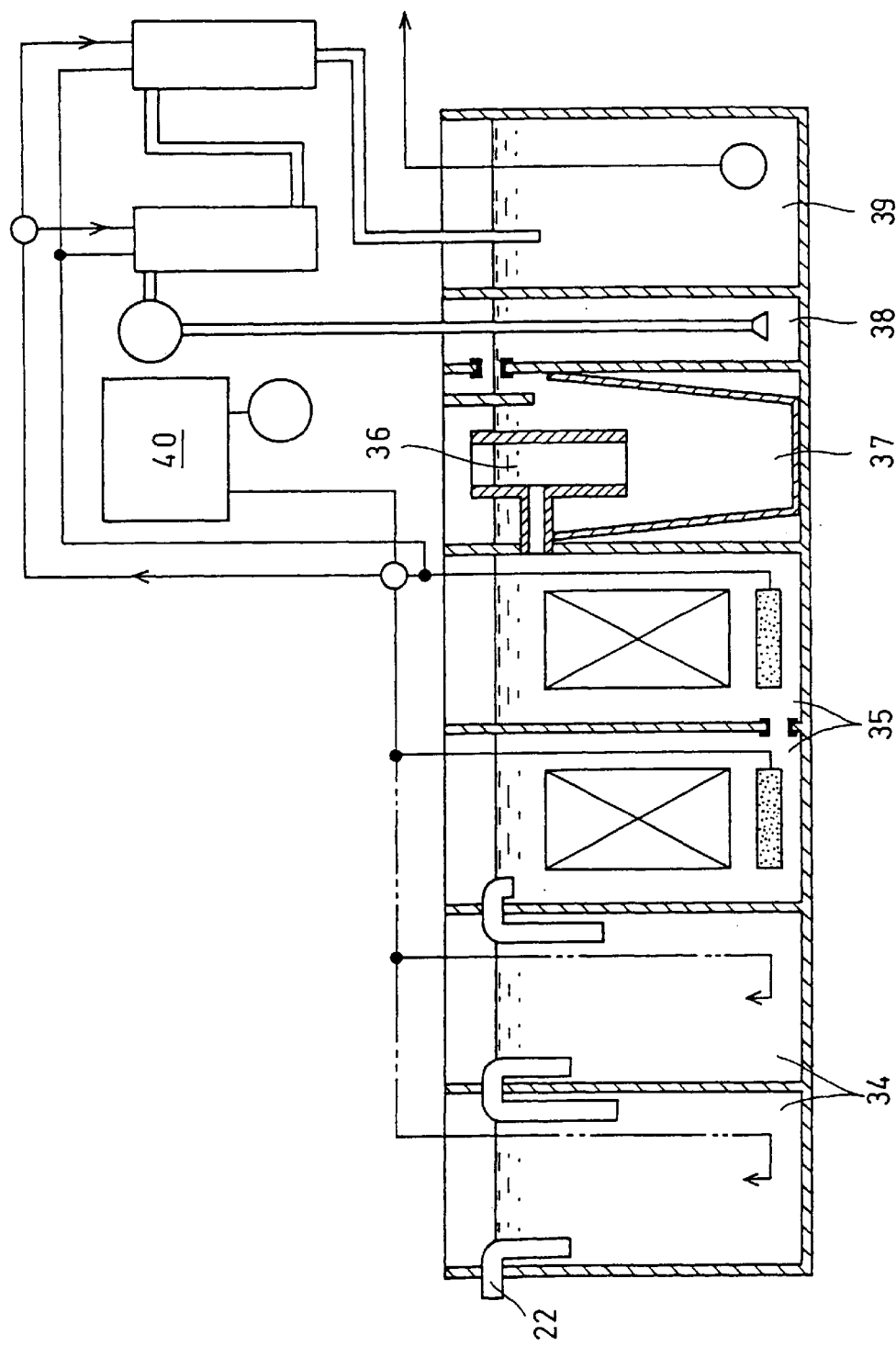
FIG. 6 is a sectional view of a third embodiment.

The third embodiment shown in FIG. 6 concerns a waste disposal system comprising the waste separator 10 of the first embodiment and the activated sludge treatment system disclosed in Japanese patent publication 10-286566 to treat the water from the waste separator 10. The sludge treatment system comprises precipitation/separation tanks 34 into which the liquid part of the waste is supplied from the separator 10 through the discharge pipe 22, contact aeration tanks 35 connected to the tanks 34 by a pipe, a precipitation tank 37 connected to the tanks 35 through a precipitation tube 36, a purification tank 38 communicating with the tank 37, and a treated water storage tank 39 communicating with the tank 38. Activated air is introduced into the tanks 38 and 39 from an activated air generator 40 to completely purify the liquid content in the waste.

In this embodiment, the discharge pipe 22 from the separator 10 may be connected directly to the contact aeration tanks 35 not to the tanks 34, because the waste discharged from the separator 10 practically contains no scum or flock. Since the liquid part contains practically no sludge either, the tank 37 may also be omitted to further reduce the size and cost of the entire system.

[Fourth Embodiment]

Figure 7:
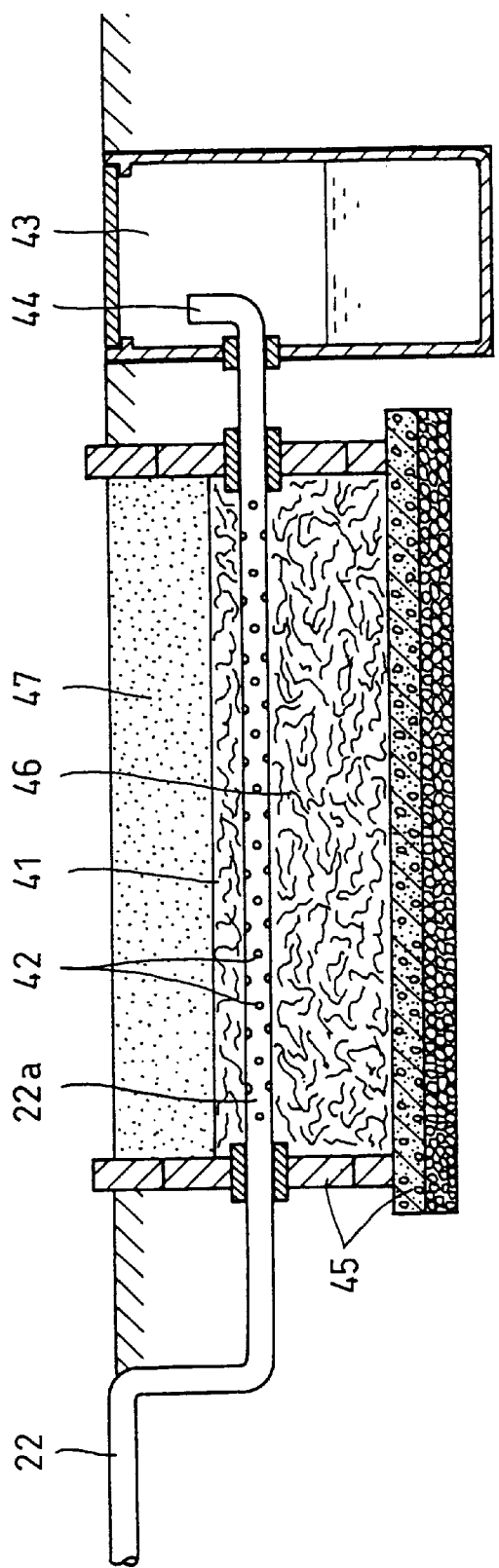
FIG. 7 is a sectional view of a fourth embodiment.

In the fourth embodiment of FIG. 7, the discharge pipe 22 of the separator 10 extends between an evaporation mat 41 and an underlying soil layer 46. The portion of the pipe under the mat 41 is formed with numerous holes 42. The mat 41 is covered by a cultured soil layer 47, which may be a flower bed. The mat 41 and the layers 46, 47 are formed in a recess dug in the ground to a suitable depth and enclosed by a layer 45 not permeable to water.

The pipe 22 extends into a manhole 43 with its end opening 44 facing up at a level above the mat 41 and below the ground surface. Thus, a large portion of liquid waste in the pipe 22 leaks through the holes 42 into the mat 41 and the layer 46, rise into the soil layer 47 due to capillary action and evaporate by solar heat. Any solid content remaining in the soil layer 47 is decomposed by microbes in the soil. Earthworms may be bred in the soil layers 46 and 47.

[Fifth Embodiment]

Figure 8:
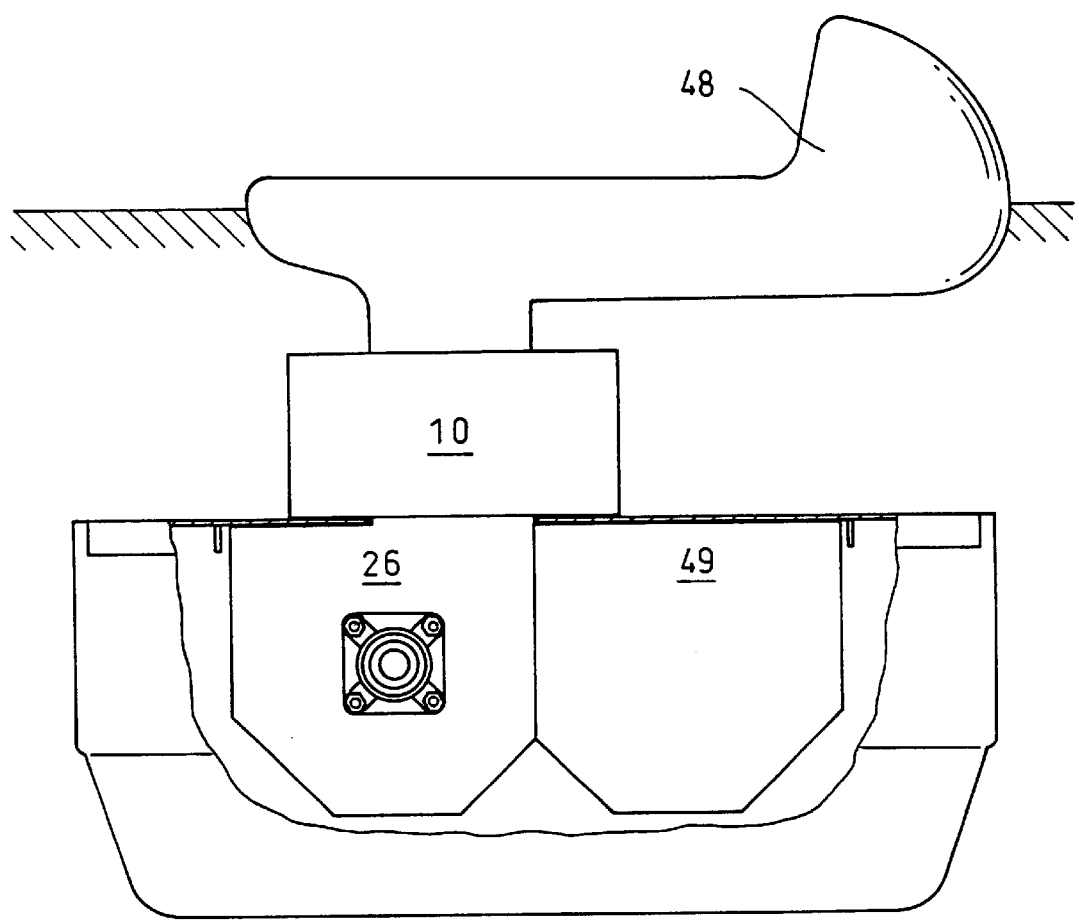
FIG. 8 is a partially cutaway elevation of a fifth embodiment.

The system of this embodiment (shown in FIG. 8) comprises the separator 10 of the first embodiment, which is provided right under a toilet bowl 48, the decomposition tank 26 of the second embodiment, which is provided under the sleeve 12 of the separator 10, and a storage tank 49 provided parallel to the tank 26 and communicating with the discharge port 21 of the separator 10.

This system is most suited for a temporary toilet, which is used mainly in the daytime and seldom used in the nighttime, and the tank 26 is preferably operated while supplying separated water into the tank 26 from the tank 49 in the nighttime to control the water content in the tank 26 to a state suitable for decomposition by microbes.

What is claimed is:

1. A waste treatment system comprising a waste separator comprising an outer box, a cylindrical member made of a water-permeable material and coaxially received in said outer box, a top plate closing the top openings of said outer box and said cylindrical member, said cylindrical member having an open bottom, a vertical rotary shaft coaxially extending through said top plate into said cylindrical member, a helical rotary brush mounted on said vertical rotary shaft, said top plate being formed with a port through which waste is introduced into said cylindrical member, a closure member for closing the bottom opening of the space defined between said outer box and said cylindrical member and formed with a discharge port, and a drive unit for rotating said rotary shaft and said brush, whereby separating waste supplied into said cylindrical member is separated into a liquid part, which passes through said cylindrical member into said space and is discharged through said discharge port, and a solid part, which is moved down in said cylindrical member by said brush and drops through said open bottom.

2. The waste treatment system as claimed in claim 1 further comprising a microbial decomposition tank provided under said waste separator so as to communicate with the interior of said cylindrical member through said open bottom thereof.

3. The waste treatment system as claimed in claim 1 further comprising an activated sludge treatment device comprising a plurality of tanks and connected to said discharge port of said waste separator.

4. The waste treatment system as claimed in claim 1 further comprising a discharge pipe connected to said discharge port and formed with a multiplicity of holes, and an evaporation mat in which at least the portion of said discharge pipe formed with said holes is buried.

5. The waste treatment system as claimed in claim 2 further comprising a storage tank communicating with said discharge port, wherein the liquid part of waste is supplied from said storage tank into said microbial decomposition tank to keep constant the water content in said microbial decomposition tank.

6. The waste treatment system as claimed in claim 2 further comprising an activated sludge treatment device comprising a plurality of tanks and connected to said discharge port of said waste separator.

7. The waste treatment system as claimed in claim 2 further comprising a discharge pipe connected to said discharge port and formed with a multiplicity of holes, and an evaporation mat in which at least the portion of said discharge pipe formed with said holes is buried.

* * * * *